(12) United States Patent
Archambault et al.

(10) Patent No.: US 8,161,464 B2
(45) Date of Patent: Apr. 17, 2012

(54) COMPILING SOURCE CODE

(75) Inventors: Roch Georges Archambault, North York (CA); Shimin Cui, Toronto (CA); Yaoqing Gao, North York (CA); Raul Esteban Silvera, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 1731 days.

(21) Appl. No.: 11/402,556

(22) Filed: Apr. 11, 2006

(65) Prior Publication Data

US 2007/0240137 A1    Oct. 11, 2007

(51) Int. Cl.
    *G06F 9/45* (2006.01)
(52) U.S. Cl. .................. 717/140; 717/141; 717/151
(58) Field of Classification Search .................. None
    See application file for complete search history.

(56) References Cited

U.S. PATENT DOCUMENTS

| | | | | |
|---|---|---|---|---|
| 6,286,135 | B1* | 9/2001 | Santhanam | 717/146 |
| 6,481,007 | B1* | 11/2002 | Iyer et al. | 717/151 |
| 6,675,378 | B1* | 1/2004 | Schmidt | 717/154 |
| 6,738,966 | B1* | 5/2004 | Tanaka | 717/151 |
| 7,243,342 | B2* | 7/2007 | Ghiya et al. | 717/141 |
| 7,343,594 | B1* | 3/2008 | Metzgen | 717/140 |
| 2002/0144244 | A1* | 10/2002 | Krishnaiyer et al. | 717/140 |
| 2003/0088864 | A1* | 5/2003 | Tirumalai et al. | 717/160 |
| 2004/0205740 | A1* | 10/2004 | Lavery et al. | 717/151 |

OTHER PUBLICATIONS

Franke et al, "Compiler Transformations of Pointers to Explicit Array Accesses in DSP Applications" Lecture Notes in Computer Science 2001, vol. 2027, pp. 69-85. Retrieved on [Sep. 23, 2010] Retrieved from the Internet: URL<http://www.springerlink.com/content/h6hc1c1ebv0kv0my/fulltext.pdf>.* van Engelen et al "An Efficient Algorithm for Pointer-to Array Access Conversion for Compiling and Optimizing DSP Applications" IEEE 2001, pp. 80-89. Retrieved on [Sep. 23, 2010] Retrieved from the Internet: URL<http://ieeexplore.ieee.org/stamp/stamp.jsp?arnumber=00955200>.*
Blickstein et al "The GEM Optimizing Compiler System" Digital Technical Journal, vol. 4, No. 4, 1992, pp. 1-17, Retrieved on [Sep. 22, 2010] Retrieved from the Internet: URL<http://www.linux-mips.org/pub/linux/mips/people/macro/DEC/DTJ/DTJ808/DTJ808PF.PDF>.*
Cierniak et al, Briki:An Optimizing Java Compiler, Compcon'97 Proceedings, IEEE, Feb. 1997, pp. 179-184, Retrieved on [Nov. 29, 2011] Retrieved from the Internet: URL<http://ieeexplore.ieee.org/stamp/stamp.jsp?tp=&arnumber=584697>.* Shashidhar et al, Functional Equivalence Checking for Verification of Algebraic Transformations on Array-Intensive Source Code, Design Automation and Test in Europe Proceedings, 2005, pp. 1310-1315, Retrieved on [Nov. 29, 2011] Retrieved from the Internet:URL<http://ieeexplore.ieee.org/stamp/stamp.jsp?tp=& arnumber=1395774>.*
Issenin et al., "FORAY-GEN: Automatic Generation of Affine Functions for Memory Optimizations", Proceedings of the Design, Automation and Test in Europe Conference and Exhibition, IEEE, 2005, 6 pages.

* cited by examiner

*Primary Examiner* — Thuy Dao
*Assistant Examiner* — Cheneca Smith
(74) *Attorney, Agent, or Firm* — Yee & Associates, P.C.; Ayla A. Lari

(57) ABSTRACT

A method of compiling source code. The method includes converting pointer-based access in the source code to array-based access in the source code in a first pass compilation of the source code. Information is collected for objects in the source code during the first pass compilation. Candidate objects in the source code are selected based on the collected information to form selected candidate objects. Global stride variables are created for the selected candidate objects. Memory allocation operations are updated for the selected candidate objects in a second pass compilation of the source code. Multiple-level pointer indirect references are replaced in the source code with multi-dimensional array indexed references for the selected candidate objects in the second pass compilation of the source code.

18 Claims, 5 Drawing Sheets

FIG. 8

```
1   integer ***a, **b, *c[N]; // N - known constant
2
3       foo( ) {
4           a = (integer ***)malloc(N * sizeof(integer **));
5           b = (integer **)malloc(N * sizeof(integer *));
6
7           for (i = 0; i < N; i++) {
8               a[i] = (integer **) malloc(M * sizeof(integer *));
9               b[i] = (integer *) malloc((i+1) * sizeof(integer));
10              c[i] = (integer *) malloc(M * sizeof(integer));
11
12              for (j = 0; j < M; j++) {
13                  a[i] [j] = (integer *) malloc(K * sizeof(integer));
14
15              }
16          }
17      }
18
19      bar( ) {
20      for (i = 0; i < N; ++i) {
21          for (j = 0; j < M; ++j) {
22              for (k = 0; k < K; ++k) {
23                  a[i] [j] [k] = ...;     // *(*(*(a+i)+j)+k=...;
24              }
25                  ... = c[i] [j];         // ...=*(c[i]+j);
26          }
27      }
28  }
```

FIG. 9

```
1   integer *a, **b, *c;
2           integer sa, sc;
3
4   foo( ) {
5       a = (integer *)malloc(N * M * K * sizeof(integer));
6       sa1 = M;
7       sa2 = K;
8       b = (integer **)malloc(N * sizeof(integer *));
9       c = (integer *)malloc(N * M * sizeof(integer));
10      sc1 = M;
11
12      for (i = 0; i < N; i++) {
13          b[i] = (integer *) malloc((i+1) * sizeof(integer));
14
15          for (j = 0; j < M; j++) {
16          }
17      }
18  }
19
20  bar( ) {
21  for (i = 0; i < N; ++i) {
22      for (j = 0; j < M; ++j) {
23          for (k = 0; k < K; ++k) {
24              a[i] [j] [k] = ...;     // *(a+(i*sa1+j)*sa2+k) = ...;
25          }
26              ... = c[i] [j];         // ... = *(c+i*sc1+j) ;
27      }
28  }
29  }
```

[0] Aliases (ids = a), Access (array, dimension = 1, stride = 4), Allocation (edge=1), points-to (ids =a[]), Type (dynamic)
[1] Aliases (ids = a[]), Access (array, dimension = 1, stride = 4), Allocation (edge=3), points-to (ids =a[][]), Type (dynamic)
[2] Aliases (ids = a[][]), Access (array, dimension = 1, stride = 4), Allocation (edge=6), points-to (ids =a[][][]), Type (dynamic)
[3] Aliases (ids = b), Access (array, dimension = 1, stride = 4), Allocation (edge=2), points-to (ids =b[]), Type (dynamic)
[4] Aliases (ids = b[]), Access (array, dimension = 1, stride = 4), Allocation (edge=4), points-to (ids =b[][]), Type (dynamic)
[5] Aliases (ids = c[]), Access (array, dimension = 1, stride = 4), Allocation (edge=5), points-to (ids =c[][]), Type (dynamic, static member)

*FIG. 10*

[0] Aliases (ids = a), Access (array, dimension = 1, stride = 4), Allocation (edge=1), points-to (ids =a[]), Type (dynamic, base), Merged Set (0,1,2), strides (ids = sa1, sa2)
[1] Aliases (ids = a[]), Access (array, dimension = 1, stride = 4), Allocation (edge=3), points-to (ids =a[][]), Type (dynamic, level1), Merged Set (0,1,2), strides (ids = sa1, sa2)
[2] Aliases (ids = a[][]), Access (array, dimension = 1, stride = 4), Allocation (edge=6), points-to (ids =a[][][]), Type (dynamic, level2), Merged Set (0,1,2), strides (ids = sa1, sa2)
[3] Aliases (ids = b), Access (array, dimension = 1, stride = 4), Allocation (edge=2), points-to (ids =b[]), Type (dynamic), Merged (NA)
[4] Aliases (ids = b[]), Access (array, dimension = 1, stride = 4), Allocation (edge=4), points-to (ids =b[][]), Type (dynamic), Merged (NA)
[5] Aliases (ids = c[]), Access (array, dimension = 1, stride = 4), Allocation (edge=5), points-to (ids =c[][]), Type (dynamic, static-member), Merged Set (4), strides (ids = sc1)

COMPILING SOURCE CODE

BACKGROUND OF THE INVENTION

1. Field of the Invention

The present invention relates generally to an improved data processing system and in particular to the efficient compilation of computer usable program code. Still more particularly, the present invention relates to a computer implemented method, apparatus, and computer usable program code for merging memory allocations into a single memory allocation to improve the performance of executable compiled computer usable program code.

2. Description of the Related Art

Today, optimizing data cache performance is important in order to increase the speed and performance of new data processing systems. Optimization of data cache performance is increasingly important because of memory latency in dynamic random access memory (DRAM).

DRAM is a type of physical memory used in most personal computers. The term dynamic indicates that the memory must be constantly refreshed or the data held in the memory will be lost. Random access memory is sometimes referred to as DRAM to distinguish random access memory from static random access memory (SRAM). SRAM is faster and less volatile than DRAM, but it requires more power and is more expensive.

Much work in optimizing computer programs for use with dynamic random access memory has been focused on two types of data locality optimizations. One data locality optimization technique involves use of code transformations, such as a loop transformation or a loop interchange to exploit spatial data locality. In a code transformation, code is passed through a compiler to form a second form of code that is executed in the data processing system. Another type of optimization involves data layout transformation. In this type of optimization, data arrays are padded and the data array data structures are reordered in order to exploit data re-use. Both of these optimization techniques are particularly effective in the domain of scientific computing because, in scientific computing, programs operate extensively on arrays.

However, many modern applications make extensive use of pointers to store data using low-level programming languages that support such pointers, such as C and C++. The pointer-intensive programs represent a difficult challenge for modern computer architectures and memory hierarchies. Typical pointer-based heap allocated data tend to have less regular access patterns, which results in a worse reference locality than an array.

SUMMARY OF THE INVENTION

The aspects of the present invention provides for a computer implemented method, apparatus, and computer usable program code for compiling source code. The method includes converting pointer-based access in the source code to array-based access in the source code in a first pass compilation of the source code. Information is collected for objects in the source code during the first pass compilation. Candidate objects in the source code are selected based on the collected information to form selected candidate objects. Global stride variables are created for the selected candidate objects. Memory allocation operations are then updated for the selected candidate objects in a second pass compilation of the source code. Multiple-level pointer indirect references are replaced in the source code with multi-dimensional array indexed references for the selected candidate objects in the second pass compilation of the source code.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 8 shows an example of pseudo source code, in accordance with an illustrative example of the present invention;

FIG. 9 shows an example of the pseudo source code shown in FIG. 8 after optimization, in accordance with an illustrative example of the present invention;

FIG. 10 shows an object descriptor list for the pseudo source code shown in FIG. 8; and FIG. 11 shows an object descriptor list after analysis of collected information for the pseudo source code shown in FIG. 8, in accordance with an illustrative example of the present invention.

DETAILED DESCRIPTION OF THE PREFERRED EMBODIMENT

Figure 1:
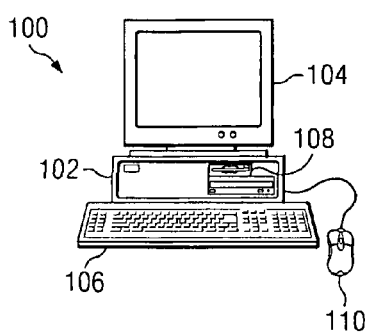
FIG. 1 is a pictorial representation of a data processing system in which the aspects of the present invention may be implemented.

With reference now to the figures and in particular with reference to FIG. 1, a pictorial representation of a data processing system is shown in which the aspects of the present invention may be implemented. Computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 may be any suitable computer, such as an IBM® eServer™ computer or IntelliStation® computer, which are products of International Business Machines Corporation, located in Armonk, N.Y. Although the depicted representation shows a personal computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
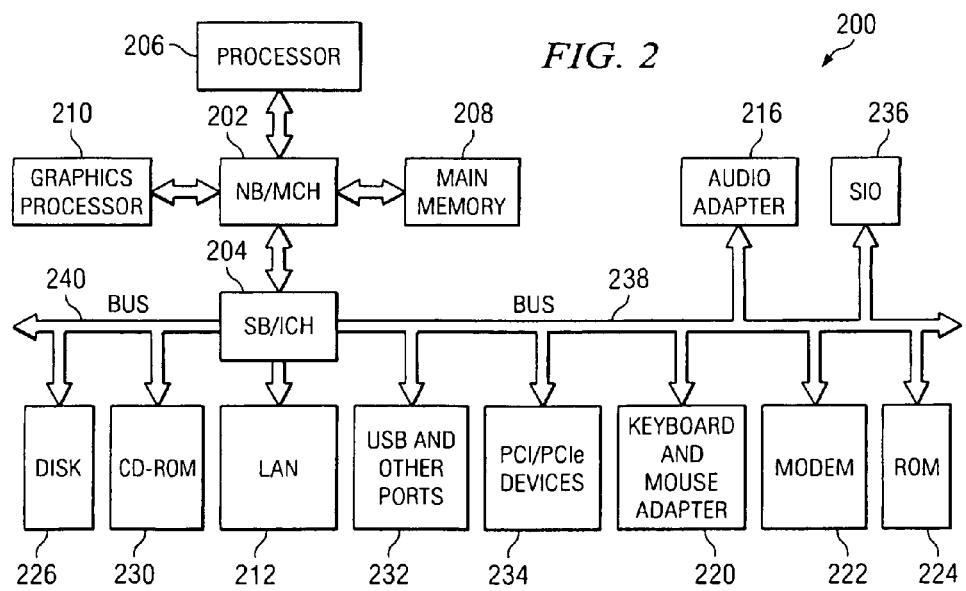
FIG. 2 is a block diagram of a data processing system in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be executed. In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the present invention may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide for a computer implemented method, apparatus, and computer usable program code for compiling source code. The methods of the present invention may be performed in a data processing system, such as data processing system 100 shown in FIG. 1 or data processing system 200 shown in FIG. 2.

As used herein, the following terms have the following meanings:

"Pointer-based access" refers to an access to a memory location using a base-pointer plus an offset manually computed. For example, the pseudo code "*(p+dim1*dim2*i+dim1*j+k)" shows an example of pointer-based access.

"Array-based access" is an access to a memory location using an implicit array layout. For the previous pseudo code of "*(p+dim1*dim2*i+dim1*j+k)", it would be p[i] [j] [k]. In this case, dim1 and dim2 are the implicit dimensions of the array.

As used herein, an "object" is a region of storage that contains a value or group of values. Each value can be accessed using its identifier or a more complex expression that refers to the object. Each object has a unique data type. The data type of an object determines the storage allocation for that object. An example is a dynamic array or a static array of dynamic arrays.

A "multiple-level pointer indirect reference" indicates an indirection where the base pointer is computed by using another indirection. Pointers contain addresses of variables that have specific values that might dynamically change at run time. Here, indirection means referencing the value through a pointer. The basic example with two levels of indirection is **p, where p is a pointer, but it includes cases where there are offsets added to some or more levels of indirection.

A "multi-dimensional array indexed reference" indicates an array reference for a multi-dimensional array, like p[i] [j] in the above pseudo code. The array base is not computed by using another indirection.

"Alias" or "aliasing" is the relationship between variables that indicates whether the variables may refer to the same memory location. Thus, "alias information" refers to information regarding the relationship between variables that indicate whether the variables may refer to the same memory location.

The term "shape" in the context of this application refers to the shape of a multi-dimensional array. The shape of a multi-dimensional array refers to whether the array is rectangular, and to the size of each dimension of the array. Thus, "shape information" is information regarding the shape of a multi-dimensional array. A static array is rectangular when it has more than one dimension and each dimension has a fixed size in the array's declaration. A dynamic array is rectangular when it has more than one indirect level and each same level has the same size.

An array "stride" specifies the reference pattern along each dimension of the array. For example, if one of the elements of the array stride is 1, then every element along the corresponding dimension of the array data will be referenced. If one of the elements of the array stride is 2, then every other element along the corresponding dimension of the array data will be referenced, and so on.

"Global stride variables" are global variables that contain the information of each dimension of an array. Global stride variables are used because the address computation will be performed as the memory access is performed; thus, the information is propagated from the allocation site to the use site. In FIG. 9, the global stride variables are sa1, sa2, and sc1. The global stride variables sa1 and sa2 contain the stride for variable a and sc1 contains the stride for variable c.

A "memory allocation operation" refers to the calls to malloc/calloc or equivalent system routines, identified by a compiler as memory allocation sites.

A "first pass compilation" refers to a compiler compiling code for a first time. The compiler compiles or converts the source code during a pass. Thus, a "second pass compilation" is a second compilation performed on the resulting code after a first pass compilation has been performed.

In the depicted examples, the method includes converting pointer-based access in the source code to array-based access in the source code in a first pass compilation of the source code. Information is collected for objects in the source code during the first pass compilation. Candidate objects in the source code are selected based on the collected information to form selected candidate objects. Global stride variables are created for the selected candidate objects. Memory allocation operations are then updated for the selected candidate objects in a second pass compilation of the source code. Finally, multiple-level pointer indirect references are replaced in the source code with multi-dimensional array indexed references for the selected candidate objects in the second pass compilation of the source code.

Thus, the mechanism and methods of the present invention provide an interprocedural compilation method for merging memory allocations of a multi-dimensional dynamic array into a single memory allocation. Merging the memory allocations in this manner may improve the performance of the resulting executable code.

The compiler generates an intermediate representation of the source code. The intermediate representation of the source code includes a call graph, a control flow graph, and a data flow graph. The compiler carries out a two-pass traversal of the call graph in the intermediate representation of the code being compiled. The two-pass method avoids redundant computation by performing an incremental update of reference marking, with a minimal number of computations per pass.

Figure 3:
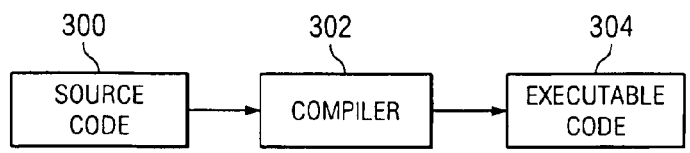
FIG. 3 is a block diagram of a prior art compiler, in which aspects of the present invention may be implemented.

FIG. 3 is a block diagram of a prior art compiler. Source code 300 is created by one or more of a number of known techniques, such as automatically, or by a human programmer. Compiler 302 and executable code 304 are computer usable programs that can be used in a data processing system, such as data processing system 100 in FIG. 1 or data processing system 200 in FIG. 2.

Source code 300 defines how a program will eventually operate, but source code 300 is usually not in a desired format for execution on a data processing system. Instead, source code 300 is often in a format that is easier for a human to interpret. After source code 300 has been defined, source code 300 is provided to compiler 302. A compiler is a computer program that translates a series of statements written in a first computer language, such as source code 300, into a second computer language, such as executable code 304. The second computer language, such as executable code 304, is often called the object or target language.

Thus, compiler 302 is, itself, a computer program designed to convert source code 300 into executable code 304. After compiler 302 has performed its programmed actions on source code 300, compiler 302 outputs executable code 304. Executable code 304 is in a desired computer-usable format and is ready for use in a data processing system.

Most compilers translate a source code text file, written in a high level language, to object code or machine language, e.g. into an executable .EXE or .COM file that may run on a computer or a virtual machine. However, translation from a low level language to a high level one is also possible. Such a compiler is normally known as a decompiler if the compiler is reconstructing a high level language program which could have generated the low level language program. Compilers also exist which translate from one high level language to another, or sometimes to an intermediate language that still needs further processing. These latter types of compilers are known as transcompilers, or sometimes as cascaders.

Typical compilers output objects that contain machine code augmented by information about the name and location of entry points and external calls to functions not contained in the object. A set of object files, which need not have come from a single compiler provided that the compilers used share a common output format, may then be linked together to create the final executable code. The executable code can then be run directly by a user. When this process is complex, a build utility is often used.

All compilers are either one-pass or multi-pass. In one-pass compilers, like early compilers for the Pascal programming language, the compilation is completed in one pass over the program source. Thus, the compilation is completed very quickly. In multi-pass compilers, such as 2-pass compilers or 3-pass compilers, the compilation is completed in multiple steps. Each step uses the result of the previous step and creates another intermediate result until a final result is generated.

Multi-pass compilers can improve final performance at the cost of compilation speed. While a multi-pass compiler usually outputs machine code from its final pass, there are several other types of multi-pass compilers. An example of a multi-pass compiler is a source-to-source compiler, which is a type of compiler that takes a high level language as its input and outputs a high level language. For example, an automatic parallelizing compiler will frequently take in a high level language program as an input and then transform the code and annotate it with parallel code annotations, such as OpenMP, or language constructs, such as Fortran's DOALL statements. Another type of multi-pass compiler is a stage compiler. A stage compiler compiles to an assembly language of a theoretical machine, like some Prolog implementations. A Prolog machine is also known as the Warren Abstract Machine. Bytecode compilers for Java, Python, and other forms of Java code are a subtype of stage compilers. In a just-in-time compiler, used by Smalltalk, Java systems, and also by the Microsoft ".Net" Common Intermediate Language (CIL), applications are delivered in bytecode, which is compiled to native machine code just prior to execution.

Thus, many different types of compilers exist for translating a computer program written in a first language into a computer program written in a second language. Often, the second computer language is executable code. The particular embodiment of the present invention described below illustrates a novel method of compiling source code in a multi-pass compiler.

Figure 4:
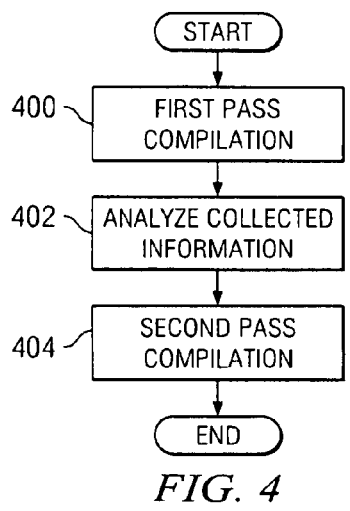
FIG. 4 is a flowchart of a method of compiling source code, in accordance with an illustrative example of the present invention.

FIG. 4 is a flowchart of a method of compiling source code, in accordance with an illustrative example of the present invention. The method shown in FIG. 4 can be performed in a compiler, such as compiler 302 in FIG. 3. The flowchart shown in FIG. 4 describes an interprocedural compilation method that allows for merging memory allocations of a multi-dimensional dynamic array to a single memory allocation in the executable code.

First, the compiler performs a forward-pass compilation of the source code (step 400). During a forward-pass compilation, the compiler performs a first pass compilation through the source code in a forward direction. Thus, the compiler traverses the call graph in the source code in a top-down order, also known as a reverse depth-first order. The call graph is a directed multi-graph for the whole program that is built by the compiler, and in which nodes represent procedures in the code being compiled and edges represent call points. During the forward-pass in step 400, pointer-based access is converted to array-based access. In addition, a collecting information step is performed. During the collecting information step, the compiler collects information on alias relationships and data shapes for arrays, as well as collecting information on pointers and their aliases in the entire source code. During this collecting information step, information such as the dimensionality of an array, stride variables, aliasing information, the "points-to" information of a pointer, and allocation points of each array can be collected. Examples of these kinds of information are shown in FIG. 10. Other kinds of information can also be collected. Additional information relating to step 400 is described below and shown in FIG. 5.

Next, the compiler analyzes the information collected in step 400 (step 402). During this step, the compiler analyzes the collected information available at the end of the forward-pass, after all nodes in the call graph have been traversed. The compiler selects candidate dynamic objects for memory allocation merging based on alias and shape analysis. In addition, the compiler creates a set of global stride variables for selected candidate dynamic objects. Additional information on step 402 is described below and shown in FIG. 6.

After analyzing the collected data in step 402, the compiler performs a second pass compilation (step 404). During this step, the compiler modifies the intermediate representation of the code being compiled. In an illustrative example, the second pass compilation is a backward-pass compilation. In this case, the compiler traverses the call graph in the code being compiled in a bottom-up order, which is also known as a depth-first order. During the second pass compilation, the compiler updates or removes the memory allocation operations for the selected dynamic objects. This process includes inserting the store operation to the new set of global stride variables. In addition, the compiler replaces the multiple-level pointer indirect references by multi-dimensional array indexed references for selected dynamic objects. Additional information on step 404 is described below and shown in FIG. 7. After performing the backward-pass (step 404), an executable code is produced as output of the compiler. The process terminates thereafter.

Thus, the compilation method described in FIG. 4 is an interprocedural compilation method for merging memory allocations of a multi-dimensional dynamic array into a single memory allocation. As described further below, alias and shape analysis is used to identify the candidate dynamic objects that can be merged with a contiguous block of memory allocation to improve cache locality. The multiple-level pointer indirect references of the dynamic array are replaced by multi-dimensional array indexed references in order to enable more aggressive compiler optimizations.

In the illustrative examples, the process shown in FIG. 4 is implemented in a link-phase portion of an optimizing compiler that generates an intermediate representation of the source code, which includes a call graph. As noted above, a call graph is a directed multi-graph in which the nodes represent procedures in the code being compiled and in which the edges represent call points. The term "procedure" includes functions and other programming language subroutines. The method shown in FIG. 4 can also make use of a control flow graph and a data flow graph. The data structures of a control flow graph and a data flow graph, and their uses in an intermediate representation of code in an optimizing compiler, are well-known in the art of computer program compilers.

Figure 5:
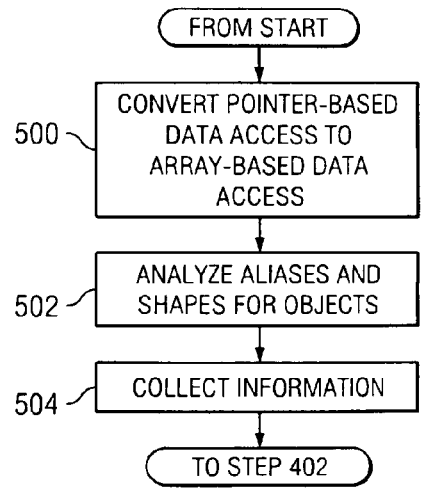
FIG. 5 is a flowchart showing a first pass compilation, in accordance with an illustrative example of the present invention.

FIG. 5 is a flowchart showing a first pass compilation, in accordance with an illustrative example of the present invention. The process in FIG. 5 is a more detailed description of step 400 in FIG. 4, in accordance with an illustrative example of the present invention. During the first pass compilation in step 400 of FIG. 4, first the compiler converts pointer-based data access to array-based data access (step 500). The conversion process is performed as the compiler traverses each node in the call graph in the intermediate representation of the code being compiled. In an illustrative example, the source code is compiled in a top-down process during the first pass compilation. Thus, the first pass compilation may be referred to as a forward pass compilation.

To perform the conversion from pointer-based access to array-based access, the dimensions of the containing loops are first analyzed and an array that conforms to the explicit memory allocation is then synthesized based on the analysis of the dimensions of the containing loops. Known techniques can be used to perform the synthesis, based on the information on arrays, pointer increments, and pointer decrements, as well as on containing loop properties.

Here, the term "containing loops" refers to those loops that contain pointer indirect references. Loops are identified with an analysis of source code based on the control flow graph and on their properties, such as their lower bounds and upper bounds. Induction variables are then collected for all the identified loops. This technique is well known in compiler area.

The result of the synthesis is code that performs array-based access. Thus, as a result of the synthesis, the pointer-based access is converted to array-based access. For example, before conversion a source code may be:

```
void sub(int *p, int *q) {
    for (int i=0; i<100; i++){
        *p++ = *q++;
    }
}
```

After conversion the above source code will be:

```
void sub(int *p, int *q) {
    for (int i=0; i<100; i++){
        p[i] = q[i];
    }
}
```

During the top-down compilation process, if the intermediate representation for a procedure is not available, then the procedure is identified as an undefined procedure. For example, if assembler code is being linked to the compiled code, then the procedure is identified as an undefined procedure. For each defined procedure reached in the top-down traversal of the call graph, the compiler transforms pointer-based data access in loops into explicit array data access.

Next, the compiler analyzes aliases and shapes for objects (step 502). The compiler performs pointer alias analysis using one of a number of known techniques, such as escape analysis. The compiler collects the pointer information and records the information in the object descriptor list. This candidate list is refined during traversal of the call graph, and is finalized at the end of the traversal. The information created by step 502 can be considered "collected information" as described in step 402 of FIG. 4. However, aliases and shapes for objects are analyzed in step 502. Thus, step 502 can be considered a "pre-analysis" performed prior to step 402 in FIG. 4 or can also be viewed as part of the "analyze collected information step" described in step 402 of FIG. 4. For this reason, although FIG. 5 indicates that step 502 flows into step 402 of FIG. 4, step 502 can also be considered a part of step 402 of FIG. 4.

An object descriptor is created for a variable of address type, which can be a pointer or a function that returns an address, excluding memory allocation functions. For the case of store operation of a pointer, if the operation is from a memory allocation, the memory allocation information is added to the descriptor. Otherwise, the descriptor for the left-hand side of the pointer and the descriptor for the right-hand side of the pointer are combined. In this case, the left-hand side of the pointer and the right-hand side of the pointer are equivalent pointers.

For a pointer de-reference, the reference pattern and points-to information are recorded for the pointer. If a pointer is passed as a parameter to a known procedure, which could include both defined procedures and known library functions, the descriptor for the pointer and the descriptor for the formal parameter will be merged. If a pointer is passed as a parameter to an unknown procedure, the pointer is considered to be an invalid candidate.

When the entire intermediate representation of the code to be complied has been traversed, the object descriptor list will contain data representing all potential candidates of pointers for optimization using memory allocation merging techniques described below. The object descriptor list can also be used for other kinds of optimizations, such as alias refinement.

An example of an object descriptor list is shown in FIG. 10. The object descriptor list is a data structure. The object descriptor list shown in FIG. 10 corresponds to candidate object descriptors found in the pseudo code of FIG. 8. The object descriptor list is used to keep track of the pointers which may be eligible for memory allocation merging. Additional information on object descriptor lists is provided below in the discussion of FIG. 10.

After analyzing aliases and shapes for objects in the source code, the compiler performs the step of collecting information (step 504). During the collecting information step, the compiler collects information on alias relationships and data shapes for arrays, as well as collecting information on pointers and their aliases in the entire source code. During this collecting information step, information such as the dimensionality of an array, global stride variables, aliasing information, the "points-to" information of a pointer, and allocation points of each array can be collected. Examples of these kinds of information are shown in FIG. 10.

Figure 6:
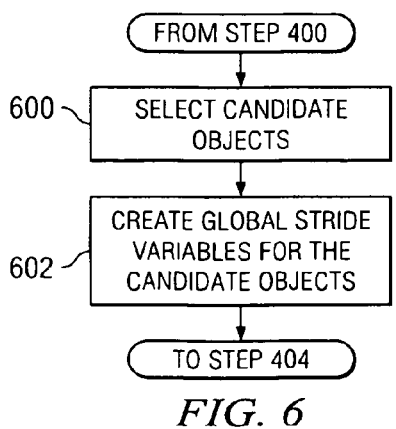
FIG. 6 is a flowchart of a process for analyzing collected information, in accordance with an illustrative example of the present invention.

FIG. 6 is a flowchart of a process for analyzing collected information, in accordance with an illustrative embodiment of the present invention. The flowchart in FIG. 6 is a more detailed description of step 402 in FIG. 4, in accordance with an illustrative example of the present invention. Thus, FIG. 6 shows additional detail regarding analyzing information collected during the forward-pass of step 400 in FIG. 4.

After building the object descriptor list, such as the one shown in FIG. 10, the compiler selects candidate dynamic objects (step 600). The compiler analyzes the list to select the candidate objects for memory allocation merging based on the type-safe analysis. For each object descriptor, the system will analyze its access pattern, its allocation information, and its points-to set to decide the candidacy of the pointer and its points-to set, and then update the descriptor. The pointer will be considered a candidate if all of the following three conditions are satisfied.

The first condition is that the pointer be a dynamic pointer. If the first level of dynamic pointer is not a static array member, then at least two levels of dynamic pointers exist. The second condition is that the access pattern for each leveled dynamic pointer be consistent. For example, if a dynamic pointer is passed to an unknown procedure, then the access pattern is considered inconsistent in the whole program code. The access pattern is considered inconsistent because the compiler cannot examine the access pattern in the unknown procedure. The third condition is that the combined memory allocation patterns of the descriptor and all of its points-to dynamic pointers have a rectangular shape. If all three conditions are met, then the pointer is considered a candidate for memory merging, as described below.

The following is an example of candidate pointers, in light of the pseudo code shown in FIG. 8. Variable "a" is a pointer-to-pointer-to-pointer-to-integer because each "*" term in FIG. 8 is a pointer. In other words, variable "a" points to another pointer, which itself points to a third pointer, when then points to an integer. Similarly, variable "b" is a pointer-to-pointer-to-integer because that variable has two "*" terms. However, variable "c" is a static array of integer pointers. Each of variables "a", "b", and "c" are dynamic pointers. Because of the equivalence between array and pointer notation, the array notation is used in the source code to access individual elements of the array. However, the data in each multi-dimensional array is not necessarily contiguous in the physical memory.

In this illustrative example, the variables "a" and "c" in lines 1, 4, 8, 10, 13, and elsewhere can be candidates for memory allocation merging. However, variable "b" in lines 1, 5, 9, and elsewhere is not a candidate for memory allocation merging. As described below, these conclusions are drawn based upon the alias relationships between the pointers and on data shape analysis.

Variable "a" is a candidate for memory allocation merging because "a", "a[ ]", and "a[ ] [ ]" are all dynamic pointers with consistent array access patterns. In addition, "a", "a[ ]", and "a[ ] [ ]" have memory allocation patterns that have an invariant "N*M*K" rectangular shape. The shape is said to be "rectangular" because the pointer "a" has a size of "N", the second level pointers "a[ ]" all have a size of "M" and the third level pointers "a[ ] [ ]" all have a size of "K".

Variable "b" is not a candidate for memory allocation merging because its memory allocation pattern has an "N*M" triangular shape. The shape is said to be "triangular" because the pointer "b" has a size of "N" but the first level pointers "b[ ]" have different sizes ranging from 1 to "M". Thus, variable "b" is not a candidate even though both "b" and "b[ ]" are dynamic pointers with consistent array access patterns.

Variable "c" is a candidate for memory allocation merging, because "c" is a static array and its array member "c[ ]" is a dynamic pointer with a consistent array access pattern. Furthermore, all the array members of "c" have the same memory allocation size.

Returning to FIG. 6, after selecting candidate objects in step 600, the compiler creates global stride variables for the candidate objects (step 602). The compiler creates a set of global variables after a dynamic pointer is determined to be a candidate for memory allocation merging. The set of global variables are used to record the stride information of the arrays. The set of global variables are assigned values at the memory allocation sites. If a global stride variable has a constant value or the same value of another global stride variable, then the compiler can record the constant or the global stride variable instead of creating a new global stride variable for this purpose.

Figure 7:
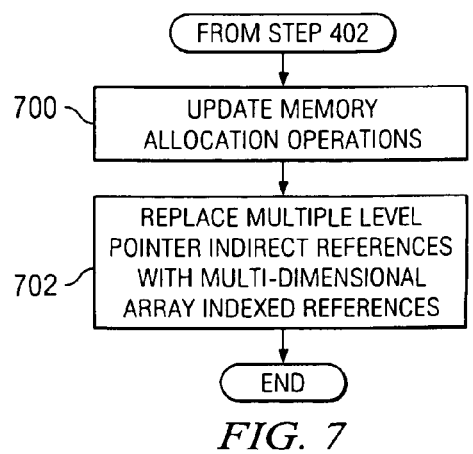
FIG. 7 is a flowchart showing a second pass compilation, in accordance with an illustrative example of the present invention.

FIG. 7 is a flowchart showing a second pass compilation, in accordance with an illustrative embodiment of the present invention. The process in FIG. 7 is a more detailed description of step 404 in FIG. 4, in accordance with an illustrative example of the present invention. After analyzing collected information in step 402 of FIG. 4, the compiler performs second pass compilation step 404 of FIG. 4. As part of step 404, the compiler first updates memory allocation operations (step 700). During this step, memory allocation merging is performed on the candidate objects identified in step 600 of FIG. 6.

Specifically, once all pointer descriptors are examined, the compiler modifies the intermediate representation of the code being compiled. This process is well-suited for inclusion in a backward-pass compilation because the compiler will traverse the call graph in a bottom-up order, or depth-first order.

Returning to FIG. 7, after updating memory allocation operations (step 700), the compiler replaces multiple-level pointer indirect references in the source code with multi-dimensional array indexed references (step 702). The compiler replaces multiple-level pointer indirect references with multi-dimensional array indexed references by transforming the candidate dynamic pointers to accomplish memory allocation merging. During this step, the address computation for array-indexed references uses the global stride variables created in step 602 of FIG. 6.

How a candidate dynamic pointer is transformed to accomplish memory allocation merging depends on the type of dynamic pointer. If the dynamic pointer is a base-type dynamic pointer, then the memory allocation is replaced by a memory allocation with the total size of combined memory allocations with this base. If the dynamic pointer is a level-type dynamic pointer, then the memory allocation is removed. If the dynamic pointer is a static member-type dynamic pointer, then the memory allocation is replaced by an allocation with the total size of the combined memory allocations with the static array. For load operation of a candidate dynamic pointer, the code is transformed into an address computation using the new set of global stride variables. If necessary, the store operation for the new set of global stride variables is also inserted into the newly compiled code. For de-reference of a highest level of candidate dynamic pointer into a merged set, the source code is transformed into an array-indexed format.

An example of how a candidate dynamic pointer is transformed to accomplish memory allocation merging is shown in FIG. 8 and FIG. 9. The compiler transforms the source code shown in FIG. 8 into a representation of the executable code shown in FIG. 9. During the transformation of code between FIG. 8 and FIG. 9, the compiler has performed memory allocation merging on the code in FIG. 8. Although the code in FIG. 9 uses the same array notation shown in FIG. 8, the multiple-level pointer indirect references of the dynamic arrays "a" and "c" in FIG. 8 are replaced by multi-dimensional array indexed references in FIG. 9. Thus, the leveled indirect references are eliminated in the pseudo code shown in FIG. 9.

For example, three-dimensional array "a[i] [j] [k]" is defined in both FIG. 8 and FIG. 9. In FIG. 8, three-dimensional array "a[i] [j] [k]" is defined by two levels of indirect references according to the term "*(*(*a+i)+j)+k)". However, in FIG. 9, three-dimensional array "a[i] [j] [k]" is defined as a multi-dimensional array indexed reference of according to the term "*(a+(i*sa1+j)*sa2+k)". The terms "sa1" and "sa2" are two global stride variables created for dynamic array "a". Thus, the pseudo code shown in FIG. 8 has been transformed such that a multiple indirect reference is transformed into a multi-dimensional array indexed reference in FIG. 9.

After memory allocation has been performed, other interprocedural or intraprocedural optimization techniques may be applied during compilation in order to further improve the performance of the final executable code. Thus, additional compilation passes, such as additional forward-pass compilations and additional backward pass compilations, or other compilation techniques may be performed on the code being compiled. Additional compilation passes can be performed before or after step 402 shown in FIG. 4. Additional compilation passes can also be performed before all information is collected and analyzed in step 402 of FIG. 4, such that step 402 is subdivided into multiple steps of collecting and/or analyzing information with compilation passes being performed between those steps. For example, some collected information can be analyzed, an additional compilation pass performed, and then remaining or new collected information can be analyzed ore re-analyzed during another analyze collected information step.

FIG. 8 shows an example of pseudo source code, in accordance with an illustrative example of the present invention. The pseudo code shown in FIG. 8 can be considered to be source code for purposes of the illustrative examples described herein. The techniques described with respect to FIG. 4 through FIG. 7 can also be applied to other forms of source code. The pseudo source code shown in FIG. 8 is typical in the C or C++ programming language when using multi-dimensional dynamic arrays and when the sizes of arrays are not known at the time of compilation. With multi-dimensional dynamic arrays, the memory storages are not contiguous and thus cache misses are at issue, especially with modern computers.

FIG. 9 shows an example of the pseudo source code shown in FIG. 8 after compilation, in accordance with an illustrative example of the present invention. The pseudo code shown in FIG. 9 can be considered to be executable code for purposes of the illustrative examples described herein. The pseudo code shown in FIG. 9 shows how dynamic pointers in the pseudo code shown in FIG. 8 can be merged into multi-dimensional dynamic arrays. The code shown in FIG. 9 is compiled code based on the source code shown in FIG. 8. The compiled code shown in FIG. 9 generally improves code performance for this kind of code. The advantages of this compiled code are discussed in paragraph below. Users normally have difficulty writing this kind of array-based memory access code because it is not transparent to the users by using the global stride variables that are unknown at the time of compilation.

FIG. 10 shows an object descriptor list for the pseudo source code shown in FIG. 8. The object descriptor list shown in FIG. 10 corresponds to candidate objects found in the pseudo code of FIG. 8. In this example, FIG. 10 lists all the object descriptors for all the six pointer symbols in the source code in FIG. 8. The six pointer symbols are "a", "a [ ]", "a [ ][ ]", "b", "b[ ]", and "c[ ]", each has an object descriptor as shown in FIG. 10. The object descriptor list is used to keep track of the pointers which may be eligible for memory allocation merging.

Each entry in the object descriptor list holds a number of attributes corresponding to a pointer. An example of an attribute includes the pointer alias set that contains the equivalent variables of the type address. For pointer "a," the alias set contains "a," as specified by the term "Aliases (ids=a)". Another example of an attribute is an access pattern. Access patterns can be a pointer or an array, and can be inconsistent. For pointer "a," the access pattern is a one dimensional array with stride four, as specified by the term "Access dimension=1, stride=4)". If the access pattern is an array access, then the dimensions and the stride information of the array is recorded.

Another example of an attribute is the type of pointers in the object descriptor list. For pointer "a," the pointer type is dynamic, as specified by the term "Type (dynamic)". The level is defined by the term "base" as shown in FIG. 11. In addition to other types of pointers, a pointer can be referred to as "dynamic" for dynamic pointers and "static" for static array element pointers. The level of the indirect reference is also recorded.

Another example of an attribute is the allocation site information, including the memory allocation size and type. For pointer "a," the allocation site information is specified by the term "Allocation (edge=1)". The call graph edge for the call site is used as a key to find the memory allocation site information.

Another example of an attribute is the points-to set that contains all the points-to variables of the equivalent pointers. For pointer "a," points-to set contains "a[ ]", as specified by the term "points-to (ids-a[ ])".

FIG. 11 shows an object descriptor list that has been modified after analysis of collected information (step 402) for the pseudo source code shown in FIG. 8, in accordance with an illustrative example of the present invention. The object descriptor list shown in FIG. 11 is the finalized object descriptor list, as described in step 602 in FIG. 6. Otherwise, the object descriptor list shown in FIG. 11 is similar to the object descriptor list shown in FIG. 10. The finalized object descriptor list shown in FIG. 11 contains additional attributes resulting from the analysis of collected information (step 402). One such attribute is the merged set that contains the list of the merged pointers if the merged pointers are sequence candidate pointers. For pointer "a," the merged pointers are "a," "a[ ]", and "a[ ] [ ]". The merged pointers are represented by the term "merged Set (0, 1, 2)" in FIG. 11. Another such attribute is the variable identification for the new set of global stride variables, if the particular pointer is a candidate for merging of memory allocations. For pointer "a," the global stride variables are "sa1" and "sa2". The global stride variables are defined by the term "strides (ids=sa1, sa2) in FIG. 11. Other attributes may also be included in the object descriptor list of FIG. 10 and/or the modified object descriptor list of FIG. 11.

The compilers and compilation methods described above may result in several advantages over known compilers and compilations methods. Primarily, the interprocedural compilation method described herein merges memory allocations of a multi-dimensional array into a single memory allocation. The resulting executable code can achieve a better reference locality because a contiguous block of memory is dedicated to the storage of the elements in the merged array. As a result, the cache locality may be improved. In addition, in the resulting executable code, leveled indirect references of dynamic arrays by leveled indexed references are eliminated. Furthermore, the method shown in FIG. 4 may reduce the computer overhead of memory allocation in terms of both execution time and memory usage. This reduction is possible because each separate allocation uses some additional space to be allocated and also uses bookkeeping capacity of the data processing system. Finally, the method shown in FIG. 4 may enable more aggressive application of compiler optimization procedures because an array-based analysis is more mature and efficient than a pointer-based analysis within optimizing compilers.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limit the invention to the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of compiling source code, the method comprising the computer-implemented steps of:
   converting pointer-based access in the source code to array-based access in a first pass compilation of the source code;
   collecting information for objects in the source code during the first pass compilation to form collected information;
   selecting candidate objects in the source code based on the collected information to form selected candidate objects;
   creating global stride variables for the selected candidate objects, wherein global stride variables comprise global variables that contain information of each dimension of an array, wherein the global stride variables are used to record stride information of the array, and wherein the stride information specifies a reference pattern along each dimension of the array;
   updating memory allocation operations for the selected candidate objects in a second pass compilation of the source code; and
   replacing multiple-level pointer indirect references in the source code with multi-dimensional array indexed references for the selected candidate objects in the second pass compilation of the source code.

2. The method of claim 1 wherein the first pass compilation comprises a forward-pass compilation and the second pass compilation comprises a backward-pass compilation.

3. The method of claim 1 wherein the collected information comprises alias information.

4. The method of claim 1 wherein the collected information comprises shape information.

5. The method of claim 1 further comprising performing an additional pass compilation.

6. The method of claim 1 wherein the method is performed by a compiler, wherein the compiler generates an intermediate representation of the source code during the method, and wherein the representation of the source code comprises a call graph, a data flow graph, and a control flow graph.

7. A computer program product comprising:
   a computer usable storage medium having computer usable program code for compiling source code, the computer program product including:
   computer usable program code for converting pointer-based access in the source code to array-based access in a first pass compilation of the source code;
   computer usable program code for collecting information for objects in the source code during the first pass compilation to form collected information;
   computer usable program code for selecting candidate objects in the source code based on the collected information to form selected candidate objects;
   computer usable program code for creating global stride variables for the selected candidate objects, wherein global stride variables comprise global variables that contain information of each dimension of an array, wherein the global stride variables are used to record stride information of the array, and wherein the stride information specifies a reference pattern along each dimension of the array;
   computer usable program code for updating memory allocation operations for the selected candidate objects in a second pass compilation of the source code; and
   computer usable program code for replacing multiple-level pointer indirect references in the source code with multi-dimensional array indexed references for the selected candidate objects in the second pass compilation of the source code.

8. The computer program product of claim 7 wherein the first pass compilation comprises a forward-pass compilation and the second pass compilation comprises a backward-pass compilation.

9. The computer program product of claim 7 wherein the collected information comprises alias information.

10. The computer program product of claim 7 wherein the collected information comprises shape information.

11. The computer program product of claim 7 further comprising computer usable program code for performing an additional compilation pass.

12. The computer program product of claim 7 wherein the computer program product comprises a compiler, wherein the compiler generates an intermediate representation of the source code when the computer program product is executed, and wherein the representation of the source code comprises a call graph, a data flow graph, and a control flow graph.

13. A data processing system comprising:
   a processor;
   a bus coupled to the processor;
   a computer usable medium coupled to the bus, wherein the computer usable medium contains a set of instructions, wherein the processor is adapted to carry out the set of instructions to:
   convert pointer-based access in source code to array-based access in a first pass compilation of the source code;
   collect information for objects in the source code during the first pass compilation to form collected information;
   select candidate objects in the source code based on the collected information to form selected candidate objects;
   create global stride variables for the selected candidate objects, wherein global stride variables comprise global variables that contain information of each dimension of an array, wherein the global stride variables are used to record stride information of the array, and wherein the stride information specifies a reference pattern along each dimension of the array;
   update memory allocation operations for the selected candidate objects in a second pass compilation of the source code; and
   replace multiple-level pointer indirect references in the source code with multi-dimensional array indexed references for the selected candidate objects in the second pass compilation of the source code.

14. The data processing system of claim 13 wherein the first pass compilation comprises a forward pass compilation and wherein the second pass compilation comprises a backward-pass compilation.

15. The data processing system of claim 13 wherein the collected information comprises alias information.

16. The data processing system of claim 13 wherein the collected information comprises shape information.

17. The data processing system of claim 13 wherein the processor is further adapted to carry out the set of instructions to perform an additional pass compilation.

18. The data processing system of claim 13 wherein the set of instructions comprises a compiler, wherein the compiler generates an intermediate representation of the source code while the set of instructions is executed, and wherein the representation of the source code comprises a call graph, a data flow graph, and a control flow graph.

* * * * *